INVENTORS
JEGANANDARAJ A. ARULPRAGASAM
HAROLD E. FRYE

BY Douglas R. McKechnie
ATTORNEY

United States Patent Office 3,434,114
Patented Mar. 18, 1969

3,434,114

VARIABLE FLOATING POINT PRECISION

Jeganandaraj A. Arulpragasam, Chandlers Ford, England, and Harold E. Frye, Wappingers Falls, N.Y., assignors to International Business Machines Corporation, Armonk, N.Y., a corporation of New York Filed Sept. 23, 1966, Ser. No. 581,603
U.S. Cl. 340—172.5 9 Claims
Int. Cl. G11b *13/00, 13/02*

ABSTRACT OF THE DISCLOSURE

A data processing system has a variable precision floating point feature wherein fractions are processed with different degrees of precision. The precision is determined by a precision register set by a switch or OP code to the desired degree. The register sets a shift counter to reduce the number of iterations where the degree of precision is less than the maximum degree and it also controls the degree of truncation of low order digits not needed for the selected degree.

This invention relates to data processing, and more particularly to apparatus providing variable precision in floating point arithmetic and related operations.

In the data processing art, arithmetic operations such as add, subtract, multiply and divide have long been performed by means of a general method commonly referred to as floating point arithmetic. In this method, each operand is expressed as an exponent (or characteristic) together with a fraction (or mantissa). Each fraction is deemed to be "floating," in the sense that it does not particularly refer to a radix point at any given order of the operand. The gross size of the operand is determined by the exponent, which determines the number of powers of two (in a binary number system), or powers of ten (in a decimal system), etc., to which the fraction is to be raised. This method of arithmetic is utilized particularly in large scale binary scientific arithmetic operations wherein large numbers to a stated precision are involved.

It has also been known in the data processing art to perform floating point arithmetic with different sized data words. In a copending application of the same assignee to G. M. Amdahl et al., Ser. No. 357,372, filed on Apr. 6, 1964, entitled, Data Processing System, there is disclosed the basic architectural definition of a data processing system as embodied in a small-sized computer. Within the definition of said system are floating point arithmetic instructions including long and short instructions. In the long instructions, a 64 bit operand contains a 54-bit fraction and an 8-bit exponent; in short floating point operations, an operand includes a 24-bit fraction and an 8-bit exponent. Thus, where the higher precision is not required, the short operands may be used, thereby significantly reducing the number of iterations required in multiply and divide operations thus to achieve a large saving in computer job operating time. It is readily seen that the practical utility of a data processing system may be further enhanced through the provision of additional instruction formats whereby further degrees of precision control may be achieved. However, this unduly complicates the programming requirements of a system, and compounds the number of decoders and operational code grouping lines required for the control logic of the system.

It is therefore a primary object of the present invention to provide a saving in time and performance of arithmetic operations of a data processing system.

Other objects of the present invention include the provision of:

A data processing system capable of performing arithmetic operations at various degrees of precision irrespective of the operational portion of the instruction governing the performance of the arithmetic;

A data processing system capable of performing arithmetic to degrees of precision selected other than by the instruction format of the instruction covering the arithmetic operation;

A data processing system precision control capable of governing the precision of successive arithmetic operations to be performed;

A floating point precision mode control capable of being set in response to a mode defining instruction; and A floating point precision mode control capable of being selectively set in response to operator control.

In accordance with the present invention, the precision of floating point arithmetic may be varied in response to a control which truncates operands by eliminating a selected number of low orders from the operands, and adjusting, when necessary, the number of iterations required to a number corresponding with the desired precision. Additionally, where the truncation of operands results in a need for shifting, such as in floating point multiplication, preshifting of the operand to a lower ordered position to provide the nontruncated orders in positions where truncated orders previously appeared is provided.

In accordance with a further aspect of the present invention, variable precision control for floating point operations is provided by means of a precision register which governs the degree of precision of all floating point operations in response to all instructions. A still further aspect of the present invention provides for setting of the precision register in response to a special instruction, part of the contents of which defines the precision to which the register is to be set. A similar aspect of the present invention provides an operator-controlled switch for setting the precision register to represent a desired degree of precision.

The invention permits the writing of programs utilizing instructions which do not conform to any particular precision (other than the maximum of the machine), or utilizing both short and long instructions, as described in said copending application of Amdahl et al. However, any given program may be run to a currently desired lesser degree of precision merely by adjusting the setting of the precision register as required. This eliminates the need for more instructions (to provide several similar instructions, each defining a different degree of precision) while permitting precision to be regulated in accordance with the most economical usage of computer time consistent with the accuracy required for any given job. Additionally, utilization of the present invention permits use of standard, library-stocked programs, which may be written for a number of computer users, to be performed at a lesser precision by one user than by another. The invention therefore permits a most economical use of floating point arithmetic in data processing systems. Truncation is necessary to avoid having meaningless low order data after performing foreshortened iteration type operations. It need not be provided when meaningless low order orders are immaterial.

Other objects, features and advantages of the present invention will become more apparent in the light of the following detailed description of an illustrative embodiment thereof, as illustrated in the accompanying drawings, wherein.

Figure 7:
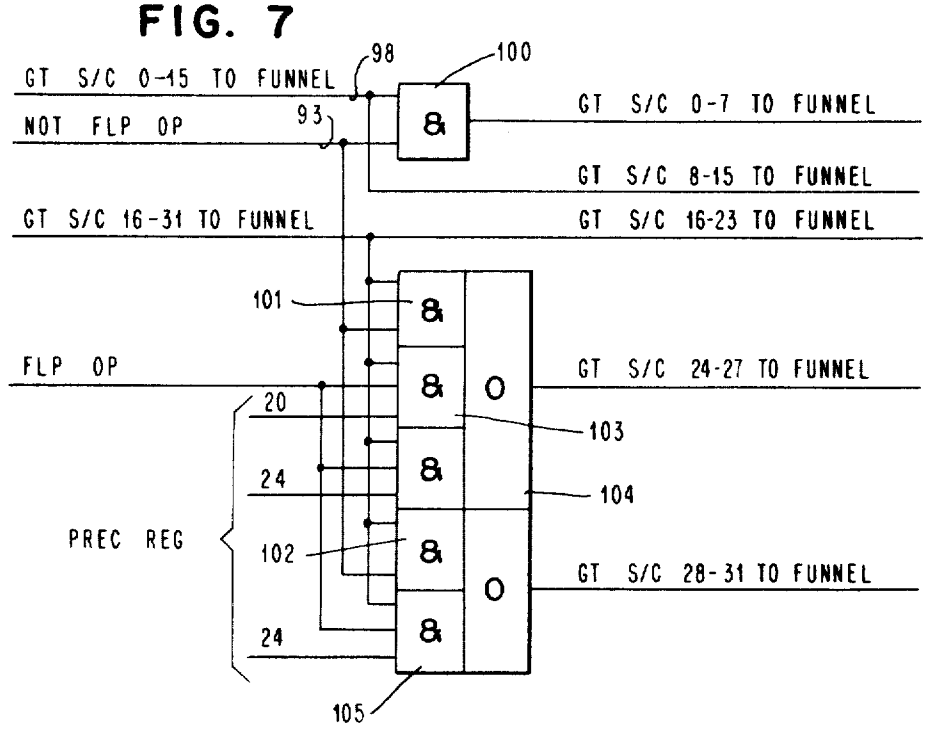
FIG. 7 is a simplified block diagram of gating controls for truncating operands in accordance with the present invention.
Figure 9:
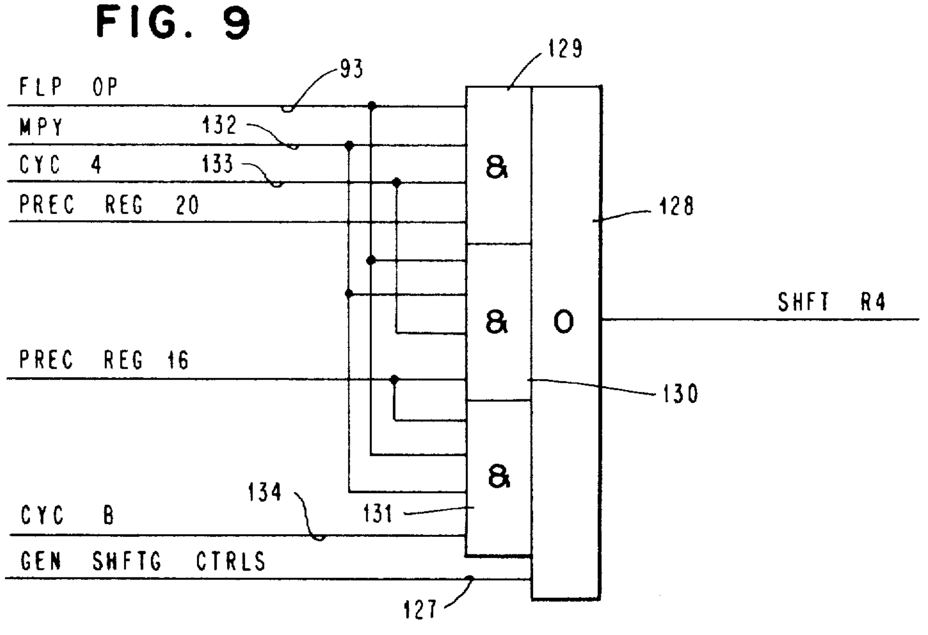
Figure 8A:
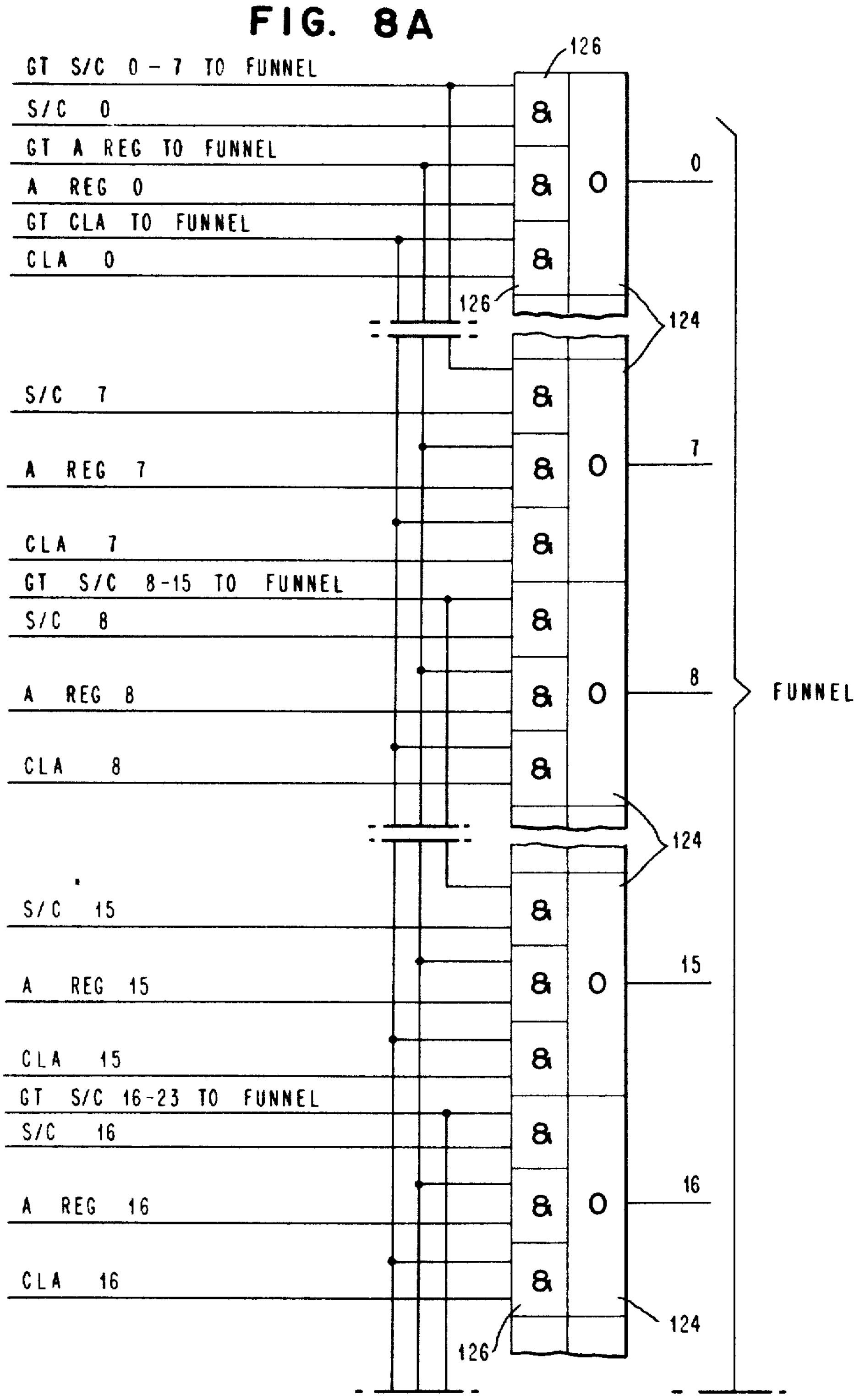
Figure 8B:
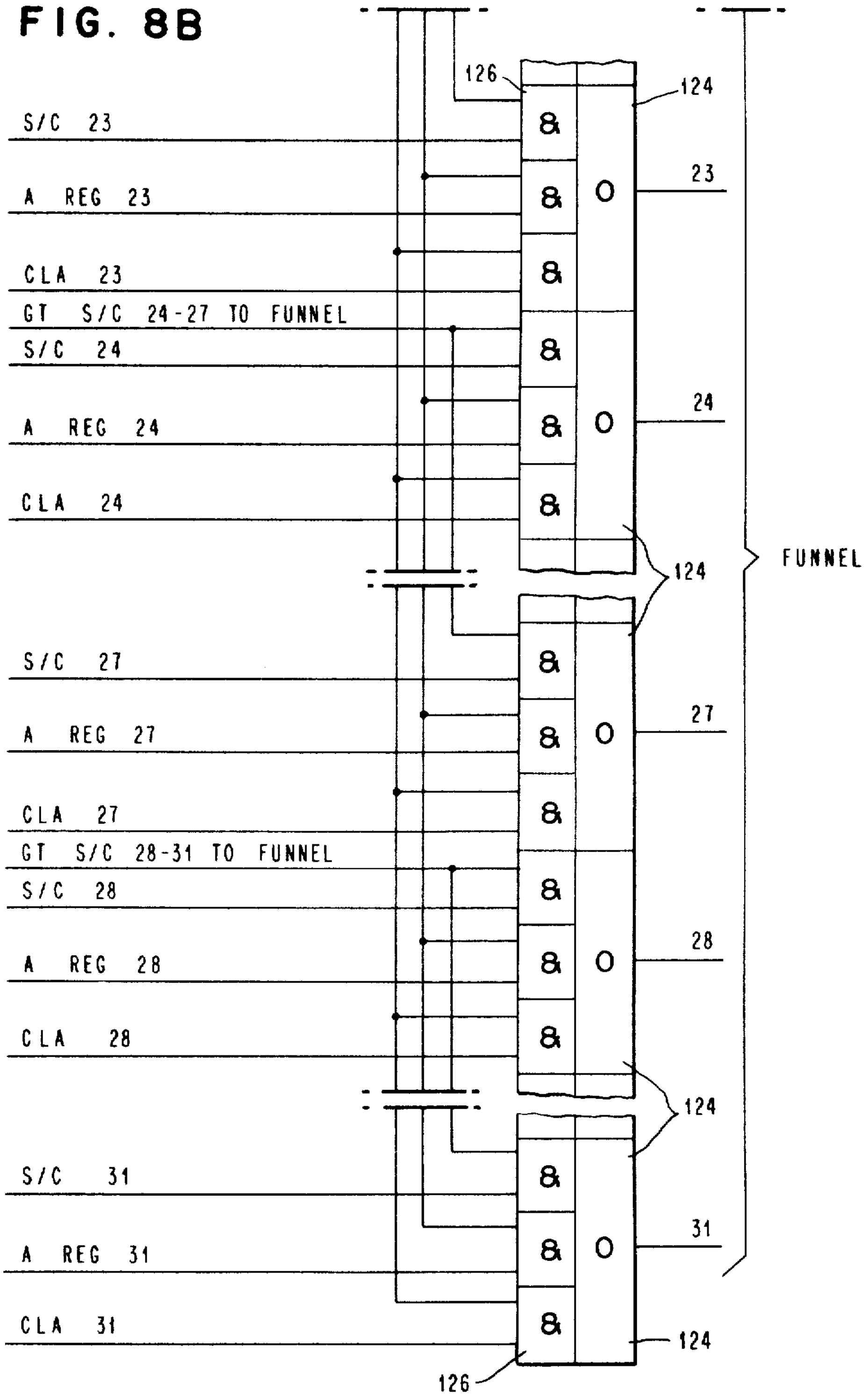

FIGS. 8A and 8B taken together comprise a simplified block diagram of a data gate responsive to the apparatus of FIG. 7, wherein floating point operands may be truncated in accordance with a desired degree of precision; and FIG. 9 is a simplified schematic block diagram of an illustrative shift control for realigning a truncated operand in accordance with the present invention.

Because of the nature of the present invention, detailed hardware illustrative of apparatus for performing iterations, such as floating point multiply and floating point divide operations, have not been included herein. The invention relates to the provision of a mode-control type of floating point precision designation, and contemplates merely the truncation of operands, the foreshortening of iterations, and necessary realignment of truncated operands. No other general functions need be performed in a usual data processing system in order to accommodate the features of the present invention.

In add and subtract operations, variable precision floating point is provided merely by truncating the operands, so that those operands which are no longer significant are merely set to zero and no result is derived therefrom. This, of course, does not save any time in a usual system; a saving of time can be had in a serial type system, such as is described in said copending Amdahl et al. application, in that if successive bytes of half words are to be provided to a similarly-sized arithmetic means, if the precision is reduced to that which will handle the complete operand in fewer passes through the adder, then a saving of time can be achieved.

Multiplication and division, by their very nature, require successive iterations, usually one-half or one cycle for each bit of one of the operands. Thus, by reducing the number of bits in the operands in response to a designation of a lower precision, a great number of iterations may be saved. The nature of various multiply and divide iterations are not germain to the present invention. Examples are given, however, in said copending application of Amdahl et al. and in another copending application of the same assignee entitled Large Scale Data Processing System, Ser. No. 445,326, filed on Apr. 5, 1965, by Olin L. MacSorley et al. A large variety of other multiply and divide iterations is available in the data processing art, and the present invention relates equally to all of them.

Considering that the present invention relates to saving computer time by eliminating unnecessary iterations in floating point multiply and divide operations, a discussion of the basic principles of these types of operations is given as a background for a better understanding of the present invention. In multiplication operations, the basic algorithm includes repetitive accumulation of successively higher-ordered portions of the multiplicand operand, under control of the multipler operand. Divide operations are, in the simplest form, a series of subtractions of one operand performed on groups of successively lower orders of the other operand. Certain refinements have been made in both of these algorithms so that certain predecoding of the nature of the operands can be done to speed up the operation. The presence or absence of these improvements and the nature of such improvements are not germain to the present invention, which relates only to the elimination of iterations by removal of low orders of operand which are not required due to the accommodation of the required function at a lesser degree of precision.

As described hereinbefore, the functions required in order to perform variable precision in accordance with the present invention include the truncation of the operand, the foreshortening of counts performed by some sort of iteration counter, and the realignment of a truncated operand when multiplication is involved. Examples of apparatus for performing these functions are described hereinafter following the description of an illustrative environment and control means capable of carrying these functions into effect.

Figure 1:
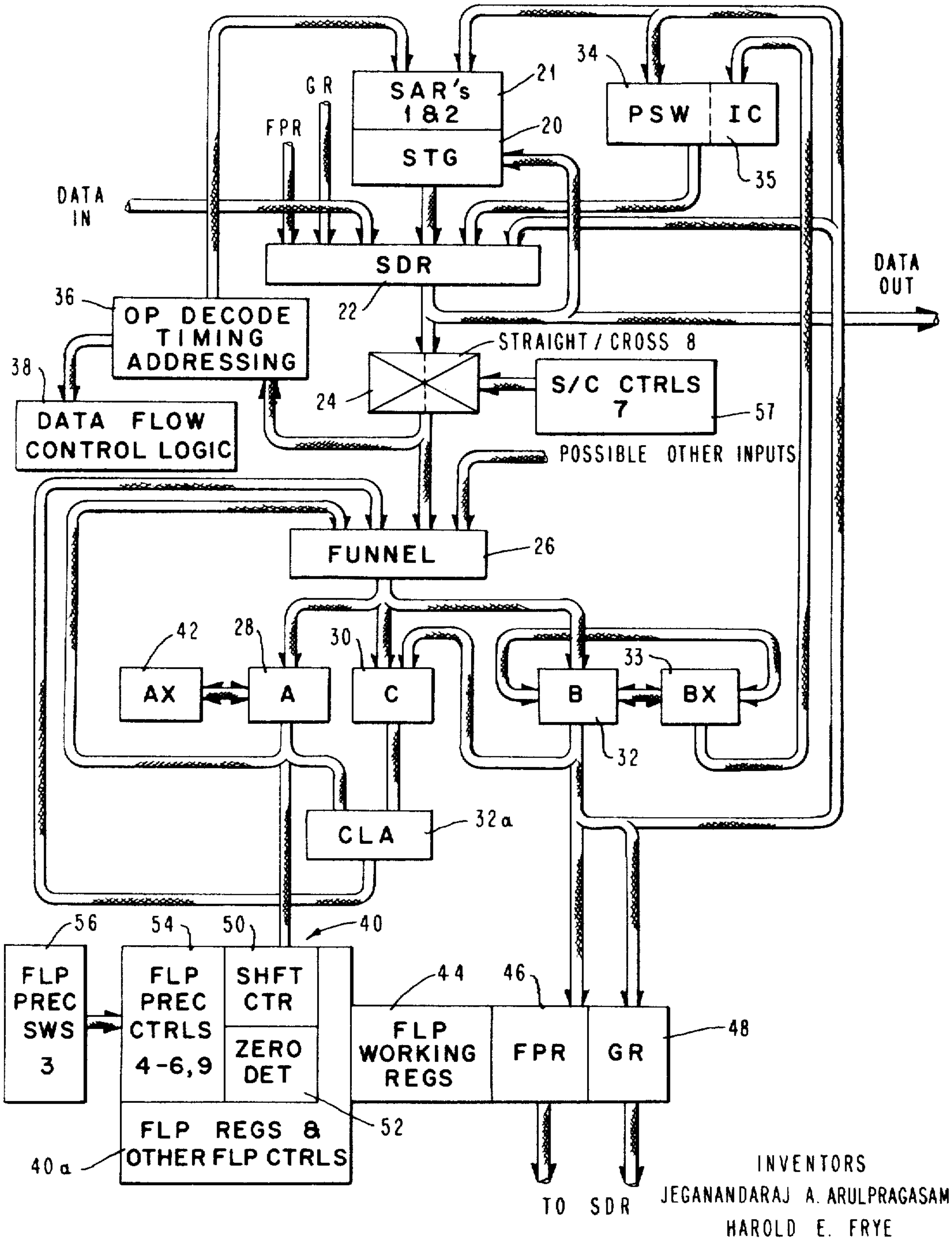
FIG. 1 is a simplified schematic block diagram of a data processing system within which the present invention may be incorporated.

Referring to FIG. 1, an exemplary data flow of a computer is shown. This form of data processing system is set forth in greater detail in a copending application of the same assignee entitled Integrated Data Processing System, Ser. No. 582,766, filed on Sept. 28, 1966, by William McGovern et al.

The system set forth in said copending application to McGovern et al. includes a 32-bit data flow, which is equivalent to one data word as defined in said copending application of Amdahl et al. and MacSorley et al. and in a manual entitled "IBM System/360 Principles of Operation," IBM Form No. A22–6821, a copy of which is available in the Scientific Library of the U.S. Patent Office. The system of said McGovern et al. application includes a storage device 20 (STG) which may be operated by appropriate associated storage address registers 21 (SAR 1, SAR 2). The storage 20 feeds a storage data register 22 (SDR) which in turn passes data to a STRAIGHT/CROSS mechanism 24 (which is referred to sometimes hereinafter by the abbreviated term "S/C"). The STRAIGHT/CROSS mechanism 24 feeds data to a FUNNEL 26 which in turn feeds the A, B, and C registers 28, 30, 32. The A and C registers 28, 30 feed a carry-look-ahead mechanism 32*a*, (CLA), the output of which is returned to the FUNNEL 26. The output of the B register 32 is applied to the storage data register 22 the SAR's 21, and to a program status word register 34 (PSW) which includes an instruction counter portion (IC) that is set by a BX register 33. The storage data register 22 is also responsive to the PSW register 34 and to data coming into the central processing unit over a DATA IN bus. The storage data register can apply data manifestations to the storage 20 and to remote parts of the system over a DATA OUT bus.

For clarity in presenting the invention, general control of the system has been simplified because the exact nature of the particular control system used is not germain to the present invention, any control configuration capable of sequencing the operation of the central processing unit being acceptable for use herewith. The usual form of operation decoding, timing, and addressing are required as is shown in block form at 36 in FIG. 1. Additionally, exemplary data flow control logic 38 is shown briefly in FIG. 1.

The output of the A register 28 is also applied to the FUNNEL 26 and to exponent registers and floating point arithmetic controls 40. The A register is additionally in data transfer relationship with an AX register 42 so as to permit transfer of the contents of the A register to the AX register concurrently with transfer of the contents of the AX register to the A register. The floating point circuitry at the bottom of FIG. 1 is further illustrative of floating point working registers 44 and general floating point registers 46 (FPR), all of which is illustrated only briefly inasmuch as it is unconcerned with the embodiment of the present invention. Floating point registers 46 are fed by the output of the B register, as are general purpose registers 48 (GR). The floating point registers and general purpose registers are addressable by the program in accordance with the architectural definition of a data processing system set forth in the aforementioned copending applications of Amdahl et al. and MacSorley et al., and Principles of Operation Manual.

The floating point registers and control circuitry 40 includes a shift counter 50, and a zero detector 52 for determining when the shift counter has reached zero. Additionally, floating point precision controls 54 (shown in detail herein in FIGS. 4–6 and 9) may modify the initial setting of the shift counter 50. The floating point precision control 54 and shift counter 50 cooperate with the OP decode, timing and addressing circuitry 36 in controlling iterations involved in arithmetic operations. The floating point precision controls 54 are settable by floating point precision switches 56 (shown in detail in FIG. 3) as well as in response to an instruction as described in detail hereinafter. The floating point registers and control circuitry 40 includes, in addition to the circuits 50–56, floating point registers and other floating point controls as indicated at 40A. The floating point precision controls 54 also govern in part the operation of STRAIGHT/CROSS controls 57 which are shown in detail in FIG. 7 so as to govern the truncation of operands in the STRAIGHT/CROSS circuit 24 which is shown in detail in FIG. 8 herein.

Figure 2:
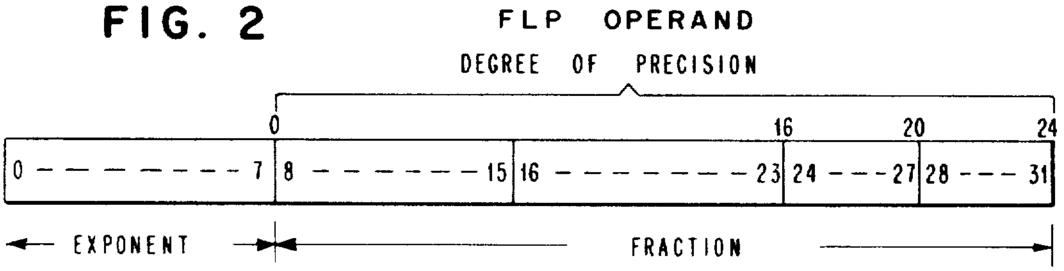
FIG. 2 is a diagrammatic illustration of a floating point operand which may be specified to three different degrees of precision.

In FIG. 2 is shown a representation of a floating point operand which is utilized in short floating point operations involving a single data word in the system descriptions of said copending applications to Amdahl et al. and MacSorley et al. and in the aforementioned Manual. As is seen in FIG. 2, a 32-bit floating point operand data word includes an 8-bit exponent, which occupies the highest-ordered 8-bit byte, and a 24 bit fraction which occupies the three low-ordered bytes including bits 8–31. In accordance with this invention, the fraction may be truncated to 20 or 16 bytes in response to the variable precision controls herein. For purposes of illustration, only a short floating point operand is illustrated in FIG. 2, that is, the truncation of a 24 bit fraction to 20 or 16 bits. However, it should be apparent to those skilled in the art, that long floating point operands may similarly be truncated in a variety of ways. For instance, in the definition of a system in said copending applications and in said Manual, long floating point operands include an additional 32 bits of fraction so that the total operand, including the exponent, occupies 64 bits. It is within the scope of the present invention to truncate a 54 bit fraction in accordance therewith by either 4 or 8 or some other number of bits in a variety of selectable degrees of truncation. Other floating point operands may be appropriately truncated in accordance with the teachings herewith.

Figure 3:
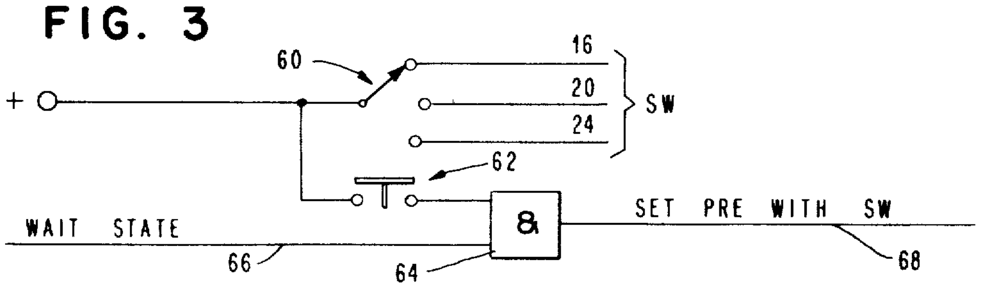
FIG. 3 is a simplified schematic diagram of precision-setitng switches for the present invention.

In FIG. 3 is shown operator controlled switches for selecting the degree of precision desired. A selector switch 60 is settable to provide a signal on any one of three lines in dependence upon whether 16, 20, or 24 bits of precision are required in the exemplary embodiment. In order to avoid changing the setting of precision during the operation of the system (which may give erroneous results), a second switch 62 may be utilized so as to render the switch 60 effective only when desired by the operator, and when permitted by an AND circuit 64 which may monitor some known quiescent state of the computer, such as the WAIT state, as indicated by a signal on the line 66. Thus, the output of the AND circuit 64 on line 68 will provide a SET PRE WITH SW signal only when the operator indicates the desire to change the setting of precision, concurrently with a quiescent state of the computer. Although the WAIT state (defined to be a non-program-running state in said copending applications and said Manual) has been illustrated in FIG. 3, other conditions, times or states may be monitored for a similar purpose.

Figure 4:
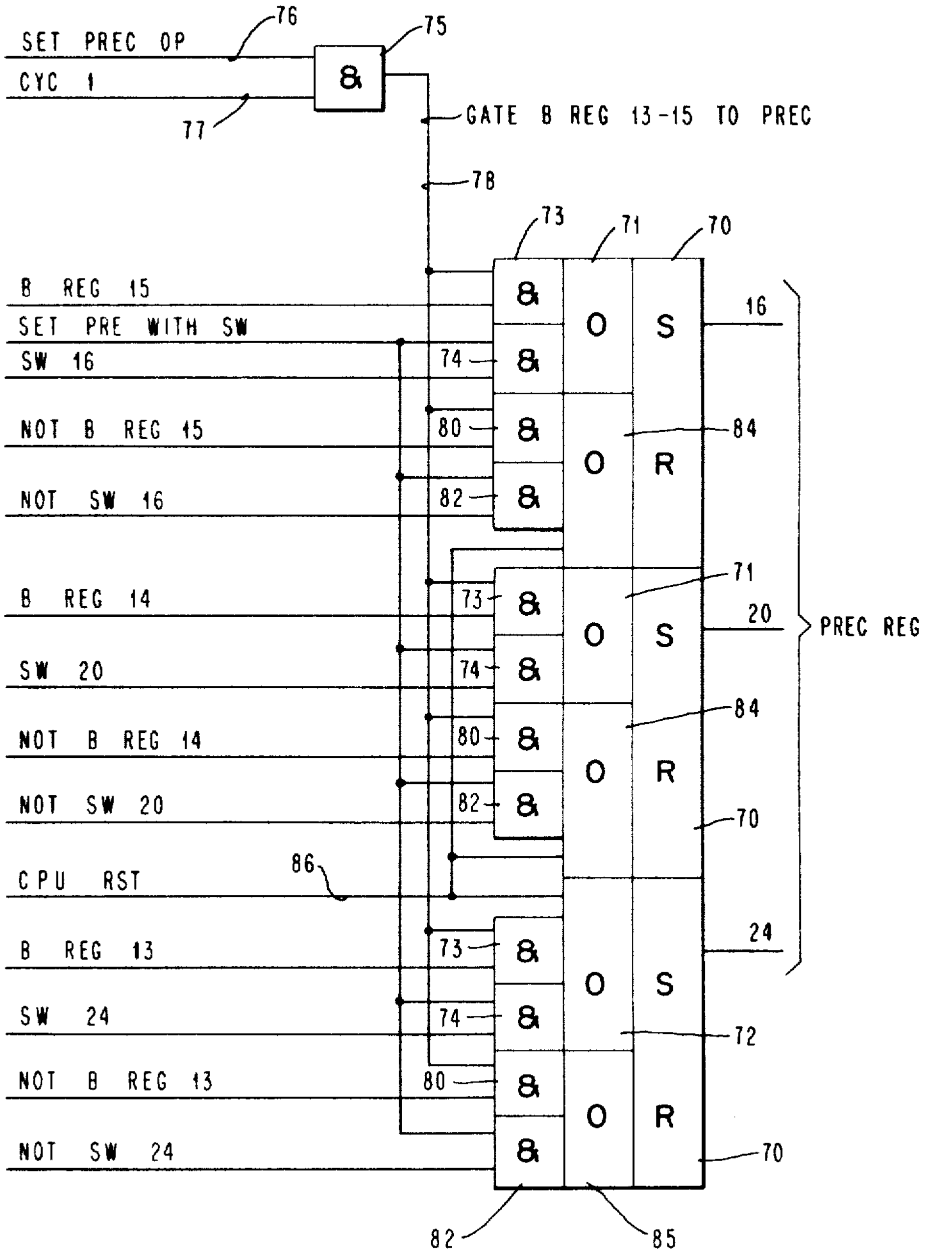
FIG. 4 is a simplified schematic block diagram of a precision register in accordance with the present invention.

In FIG. 4 is illustrated a precision register which may be utilized to maintain a stable setting of the degree of precision which is desired to currently control operations in a computer. The precision register of FIG. 4 comprises a plurality of latches 70 each of which is settable by a related OR circuit 71, 72 in response to corresponding AND circuits 73, 74. The AND circuits 73 are utilized to set the precision register in response to an instruction which may be entitled "set precision". When this instruction is decoded in the OP decode circuits 36 (FIG. 1) it will cause an AND circuit 75 to operate in response to a signal on a related SET PREC OP line 76 during a correct time in the operation of the machine, such as cycle 1, as indicated by a signal on the line 77. The output of the AND circuit 75 on a line 78 may be considered to be a GATE B REG 13–15 to PREC line. This will cause each of the AND circuits 73 to be responsive to related bit positions of the B register, in a manner described more fully hereinafter. The signal on the line 78 is also applied to a plurality of AND circuits 80, which along with related AND circuits 82 may each cause corresponding OR circuits 84, 85 to set a related latch 70 into the reset, off, or zero position. The AND circuits 80, 82 are supplied in addition to the AND circuits 73, 74 so as to provide bipolar setting control for the latches 70. Thus with a signal on line 78, each latch will either be set or reset, respectively, depending on the presence or absence of a related bit in the B register.

In the architectural definition of a data processing system set forth in said Manual and said copending applications, there are a series of instructions in the SI format called "immediate instructions." These instructions include in bits 0–7 an 8-bit operand which defines the operation to be performed, and include in bits 8–15 an 8-bit byte of data, called immediate data because it appears immediately within the controlling instruction. Such an instruction may be adapted for use in setting the precision register by providing an operational code to control the setting of the precision register, together with a field of data bits to govern the particular setting of the precision register in dependence upon the desired degree of precision. The instruction may be thought of as one which puts the central processing unit into a particular precision mode, that mode controlling the floating point operations of the computer until a different precision is set either by a switch or by a further instruction. As an example merely, it has been assumed herein that the three lowest ordered bits of the immediate data, bits 13–15 of the set precision instruction, will be utilized to indicate precision of 24, 20 and 16 respectively. Of course, it is possible that these immediate bits might be utilized in an encoded fashion, so that in the present example of selection from among three degrees of precision, bit 15 might indicate a precision of 16, bit 14 might indicate a precision of 20, and the presence of both of these bits might indicate a precision of 24. Thus the remaining bits of the immediate data field of the instruction may similarly be used in an encoded fashion to supply any degree of precision within a system having precision control over any number of bits. Another alternative would be to use the base and displacement addressing fields of an immediate instruction (or some other instruction) to govern the setting of the precision register. The nature of the definition of the particular instruction used is immaterial to the present invention, and suitable variations may be implemented by those skilled in the art to suit any particular embodiment thereof.

The AND circuits 74, 82 respond to the setting of the switch of FIG. 3 so as to similarly set the latches 70 in a bipolar manner depending upon the presence or absence of signal leaving the switch 60. Although not shown herein, it is obvious that the complement of any bit coming out of the switch may be formed by an inverter, or alternatively, the polarities of outputs and inputs of various circuits may be chosen so as to implement the utilization of the complement. Therefore, inverters or other designed expedients relating to complements have been omitted from the present description. The OR circuit 72 differs from the OR circuits 70 in that it may be operated by a signal on the CPU RST line 86. This provides automatic setting of maximum precision any time that a CPU reset is involved. Line 86 is also applied to the OR circuits 84 of the latches 70 relating to a precision of 16 and 20, so as to turn these off. The CPU RST line merely indicates that suitable controls may be provided to reset the precision register. The OR circuit 85 has no reset input thereto so that the latch 70 relating to a precision of 24 is automatically set and the other two latches are reset during either type of a resetting operation.

Figure 5:
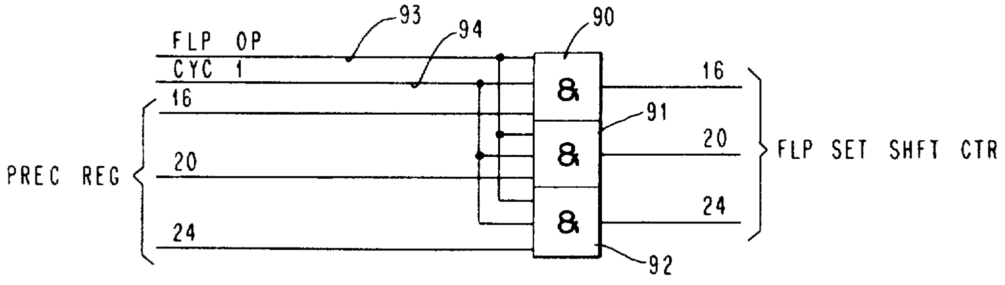
FIG. 5 is a simplified schematic block diagram of precision register shift counter controls for the present invention.
Figure 6:
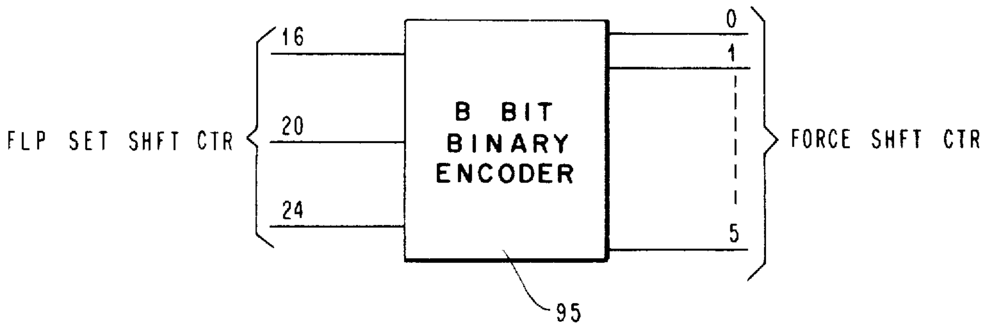
FIG. 6 is a simplified illustration of a binary encoder for setting a shift register in accordance with the present invention.

One of the uses of the output of a precision register in accordance with the present invention is to foreshorten iteration such as, for example, by setting a shift counter to a corresponding starting value in dependence upon which degree of precision is required. Obviously, it takes fewer iterations to perform floating point division on 16-operands than it does on 24-bit operands. It is the elimination of these iterations which result in a great saving in computer operating time in floating point operations in which a high degree of precision is not required. In FIG. 5, a plurality of AND circuits 90–92 are each responsive to a signal indicating a floating point operation on a line 93, at some appropriate time such as during cycle 1 of a floating point operation as indicated by a signal on lines 93 and 94. Each AND circuit 90–92 relates to one of the particular outputs of the precision register shown in FIG. 4 so as to generate a related signal for governing the setting of a shift counter at the start of a floating point operation involving iterations (such as multiply and divide). The output of FIG. 5 may be applied to a binary encoder 95 as shown in FIG. 6 so as to generate signals forcing the shift counter to an appropriate setting in dependence upon the amount of precision required. The circuit of FIG. 6 illustrates a simple binary encoder, which assumes that one iteration is required for each bit in the operand at the related degree of precision. Thus, the shift counter might be set to a count of 16 if a precision of 16 bits is indicated, and to a count of 24 if a precision of 24 bits is involved. In certain environments, it may be necessary to set the shift counter to a higher or lower value to accommodate variations in the control circuitry of such an environment. For instance, if certain pre-examination techniques are required, and these may involve one or two cycles, then the shift counter would be set to a value one or two higher than the number of bits involved. On the other hand, division performed with a uniform shift of two as described in said copending MacSorley et al. application, would require a setting of the shift counter which is one-half of the number of bits of precision since two bits are handled in each cycle. Similar other variations relating to the particular algorithm and apparatus involved may be made in the control of the shift counter by a precision register in accordance with the example given herein. An example of circuitry utilized to force a shift counter for controlling floating point iterations is shown in FIG. 792 of said copending MacSorley application. The shift counter controlled thereby is illustrated in FIGS. 617–620 of said copending MacSorley et al. application. It will be understood by those skilled in the art that the nature of the shift counter and of the controlling circuits therefore are dependent upon the entire architecture of any given system within which the present invention may be embodied; the invention herein is pertinent thereto only in the provision of a suitable alteration in the initial setting of an iteration control (such as a shift counter) so as to foreshorten the length of operations involved when a lower degree of precision is selected in accordance with the present invention.

Referring now to FIG. 7, controls for gating more or less of an operand in accordance with the degree of precision required is shown in exemplary form. The truncation of operands to suit a varying degree of precision in accordance with the present invention is most expeditiously achieved by selectively gating portions of the operand, while simultaneously blocking those portions of an operand and which are to be eliminated in order to effect a proper degree of truncation of the operand. The output signals in FIG. 7 reflect this degree of truncation control. In FIG. 7, a signal on a GT S/C 0–15 TO FUNNEL line 98 is fed to an AND circuit 100 which generates a signal on the GT S/C 0–7 TO FUNNEL line, provided that it is not inhibited by the absence of a signal, indicating other than a floating point operation, on a line 93. The AND circuit 100 prevents gating of the floating point exponent into the A, B and C registers (see FIG. 2). However, during other than floating point operations, the general controls which are described in FIGS. 14–17 of said copending application of McGovern et al. will cause normal gating of bits 0–15 by gating both bits 0–7 and bits 8–15. A second byte of the operand (including bits 16–23) may be gated in response to a signal on the GT S/C 16–31 TO FUNNEL line 111. This line is also applied to five AND circuits 101–105. The AND circuits 101, 102 cause normal gating of bits 24–31 in response to signals generated in accordance with FIGS. 14–17 of said copending McGovern application. The AND circuits 104, 105 may be operated in response to a precision of 24 during floating point operations (93) so as to cause gating of bits 24–31. It is apparent with respect to FIG. 2 that bits 16–23 are always selected in floating point operations in accordance with the embodiment disclosed herein. To the contrary, an AND circuit 103 which is also fed by the floating point OP signal on line 93 is operated only when a precision of 20 is indicated by a signal on a corresponding output of the precision register. Thus bits 24–27 will be gated when precisions of 20 and 24 are selected but are not gated in the case of a floating point operation using only a 16-bit precision. In a similar fashion an AND circuit 105 causes gating of bits 28–31 when 24 bits of precision are required (which bits are *not* gated for precisions of 16 and 20).

The gating signals generated in FIG. 7 are utilized in the FUNNEL illustrated in FIG. 8. This is similar to the FUNNEL shown in FIG. 13 of said copending McGovern et al. application, but includes additional controls so as to give greater definition to the number of bits being passed through the funnel in accordance with the truncation requirements of the present invention. It should be apparent that the OR circuits 124 shown in FIG. 8 are operated by related AND circuits 126 in dependence upon combinations of input signals thereto. Thus the outputs of FIG. 7 are used to gate bits from the straight cross circuit (S/C, shown in FIG. 12 of said copending McGovern et al. application) to the funnel. Gating of the A register 28 or the carry-look-ahead 32*a* (FIG. 1 herein) are controlled in the same fashion as shown in the funnel of said copending McGovern et al. application.

Thus, the precision register provides signals in FIG. 7 which control the gating of the funnel in FIG. 8 in a manner to provide truncation of operands in accordance with the present invention by selectively not permitting the passage of low order bits which fall beyond the degree of precision selected.

In the case of a multiplication operation, truncation of the operand leaves a number of low order zeros (FIG. 2) so that the multiplication operation would proceed involving zeros, and the foreshortening of the iteration by means of an appropriate smaller setting of the shift counter would be of no avail unless the truncated operand is realigned so as to place the lowest-ordered useful bit (after truncation) into the lowest ordered position of the register from which the operand is to be sensed. In said copending application of McGovern et al., shifting in varying degrees to the right and to the left between the B and the BX registers is provided. Therein a signal on a SHFT R4 line will cause all of the bits in the B and BX register to be transposed four orders to the right. In FIG. 9 herein, an OR circuit 128 generates the SHFT R4 signal in response to any suitable general controls 127

(for various operations involved in a computer), or in response to any one of three AND circuits 129–131. Each of the AND circuits 129–131 is operated only during floating point multiply due to the requirement of signals on the lines 93 and 132. Each of these signals would be developed by the OP decode circuitry 36 (FIG. 1) in a well known manner, such as the manner illustrated in said copending applications of Amdahl et al. and MacSorley et al. For illustrative purposes herein, the circuitry of FIG. 9 is illustrated with respect to two different cycle timing controls referred to as cycle A and cycle B. The particular timing and nature of these controls is determined by the algorithm and apparatus used in any given implementation of the present invention, and the detail thereof is not germain here. Cycle B is defined as being a time later than cycle A, and each of these cycles are defined as being appropriate times for realigning of an operand during a multiply operation so as to present the lowest ordered useful bits in the operand, following truncation, to the low order position of the B and BX registers. A signal relating to cycle A on a line 133 may operate both AND circuits 129 and 130. If precision has been set for 20, then the AND circuit 129 will operate causing a shifting of four bits to the right in the B and BX registers. On the other hand, if a precision of 16 is indicated, then a signal on the cycle A line 133 will cause an AND circuit 130 to generate the SHFT R4 signal during cycle A, and an AND circuit 31 will respond to a cycle B signal on line 134 so as to cause a second four bit shift to the right of the operand during cycle B. It should be obvious to those skilled in the art that any number of shifts, of an appropriate number of bits, may be supplied in an implementation of the present invention so as to suit the degrees of precision which are selectable, and to utilize the hardware provided in apparatus incorporating the present invention. The circuitry of FIG. 9 is exemplary merely of one of the three functions required in order to accommodate the improvement of the present invention into a data processing system.

There has thus been described an embodiment of the present invention including exemplary apparatus designed to perform the functions required in order to accommodate variable precision control in accordance with the present invention. A saving in time is achieved in floating point arithmetic iterations, such as multiply and divide, and may also be achieved in certain floating point non-arithmetic operations such as data moves in the floating point format, whenever a lesser degree of precision is acceptable. Add and subtract operations normally are not performed by iterative algorithms, but a saving in time may be achieved by performing add and subtract operations to a lower precision in any case where the data flow of a central processing unit is less than the length of a data word with which the central processing unit must operate. Thus, if a 16-bit data flow were provided, the embodiment herein would permit floating point add and subtract operations in a single cycle when precision of 16 were selected, but would require additional cycles within which truncation would be effected for precisions of 20 and 24 bits.

The invention having been described with respect to a preferred embodiment thereof, it should nonetheless be apparent to those skilled in the art that various changes and omissions in the form and detail thereof may be made therein without departing from the spirit and the scope of the invention, which is to be limited only as set forth in the following claims.

What is claimed is:

1. A variable precision data processing apparatus of the type which performs iterative operations, comprising:
means independent of data word length for defining the number of orders of operands to be utilized in an operation, said means including a switch settable to select the desired degree of precision; and
iteration control means responsive to said defining means for foreshortening the number of iterations involved in a data processing operation in dependence upon the degree of precision indicated by said defining means.

2. The invention described in claim 1 wherein said defining means includes a register settable in response to setting of said switch to indicate the desired degree of precision.

3. The invention described in claim 2 wherein said iteration control means comprise:
iteration counting means;
and means responsive to said register for setting said iteration counting means to differing values in dependence upon the setting of said register.

4. The invention described in claim 2 additionally comprising:
instruction responsive means for selectively setting said register to a degree of precision defined by an instruction.

5. The invention described in claim 1 additionally comprising:
means responsive to said defining means for correspondingly truncating said operands at the low orders thereof.

6. The invention described in claim 5 wherein said truncation means comprises gating means, responsive to said defining means, and wherein said gating means is divided into groups of orders, said groups of orders corresponding with selectable degrees of precision, said gating means passing therethrough only those orders of an operand included within the degree of precision specified by said defining means.

7. The invention described in claim 6 wherein said defining means includes a register settable to indicate the desired degree of precision.

8. The invention described in claim 7 wherein said gating means is controlled by said register means.

9. The invention described in claim 5 wherein said data processing apparatus includes multi-order data flow, and additionally comprising:
operand alignment means responsive to said defining means for shifting an operand after truncation so that the lowest order bit of the truncated operand appears in the lowest order of said data flow.

References Cited

UNITED STATES PATENTS

| | | | |
|---|---|---|---|
| 3,022,006 | 2/1962 | Alrich et al. | 235—160 |
| 3,193,669 | 7/1965 | Voltin | 235—164 |
| 3,244,864 | 4/1966 | Jones | 235—168 |
| 3,290,493 | 12/1966 | Githens et al. | 235—164 |

PAUL J. HENON, *Primary Examiner.*

RAULFE B. ZACHE, *Assistant Examiner.*

U.S. Cl. X.R.

235—156, 159, 160, 164